United States Patent Office 3,046,200
Patented July 24, 1962

3,046,200
METHOD OF PRODUCING STREPTOKINASE AND STREPTODORNASE
Stephen Aloysius Szumski, Pearl River, N.Y., assignor to American Cyanamid Company, New York, N.Y., a corporation of Maine
No Drawing. Filed Jan. 30, 1961, Ser. No. 85,465
7 Claims. (Cl. 195—68)

This invention relates to improvements in the art of producing enzymes. More particularly, the present invention is concerned with improvements in the methods by which certain species of streptococci are caused to produce beneficial enzymes in a fermentation medium.

In recent years considerable interest has developed in the lysis of certain materials with the aid of enzymes. Among the enzymes receiving the most attention are streptokinase and streptodornase. Streptokinase acts indirectly upon a substrate of fibrin or fibrinogen by activating a fibrinolytic enzyme in human serum which can split fibrin into smaller fragments and thus cause rapid dissolution of blood clots and fibrinous exudates. Streptodornase acts directly upon a substrate of desoxyribonucleoprotein and desoxyribonucleic acid, which are the main constituents in nuclei and constitute 30% to 70% of the sediment of purulent exudates. Streptodornase splits the nucleoprotein into free purine bases and pyrimidine nucleosides, and thus causes a marked drop in the viscosity of purulent exudates.

Because of the above properties, mixtures of streptokinase and streptodornase have shown utility in the experimental treatment of certain burns, in the drainage of purulent sinuses, in the treatment of chronic infected bone abscesses or osteomyelitis, in the drainage of clotted blood from internal wounds, and in the drainage of the block in the spinal column occurring in various types of meningitis. More generally, mixtures of these two enzymes are useful in the treatment of empyema, hemothorax, hematoma and chronic suppurative infections.

Mixtures of streptokinase and strepodornase are produced by certain bacteria when grown in various media. The most frequently employed bacteria are the beta hemolytic streptococci and especially those of the Lancefield groups A, "human" C, and G. Best results have so far been obtained with the C group as these bacteria grow well under less strictly controlled conditions and produce smaller quantities of by-products. The fermentation procedure generally comprises inoculating with seed bacteria a fermentation medium comprising a source of basic nitrogen and allowing the bacteria to grow under aerobic conditions.

Many commercially available proteins or protein digests may be employed to furnish the basic nitrogen, for instance, animal protein digest, casein digest, and plant protein digest. The essential requirement of the basic nitrogen source is that it furnishes the necessary quantities in free or combined form of the well known essential aminoacids. The preferred source of basic nitrogen, especially if the fermentation is to be conducted on a large scale, is enzyme hydrolyzed casein.

The amount of basic nitrogen material employed per unit volume of fermentation medium may be varied within relatively wide limits. If one is primarily interested in purity of product, low concentrations are recommended, for instance, 2 to 6 parts by weight of basic nitrogen material per each 300 parts by volume of medium. This may be advantageous when one is concerned with producing material to be used in intravenous injections. On the other hand, if one is interested in the highest total yield, then relatively high concentrations are recommended, for instance, 10 to 20 parts by weight of basic nitrogen material per each 300 parts by volume of medium.

While the enzyme hydrolyzed casein constitutes the major part of the fermentation medium, two other ingredients, glycine and an organic sulfhydryl reducing agent, are also necessary. The amount of glycine employed in preparing the fermentation medium may vary within wide limits, for instance, from 1.0 to 350 parts by weight of glycine for each 1,000 parts by weight of casein digest. The optimum amount has been found to be from about 200 parts of glycine for each 1,000 parts by weight of casein digest. The amount of organic sulfhydryl reducing agent employed in the fermentation mixture may also be varied within wide limits, for instance, from 0.01 to 0.5 mole of sulfhydryl reducing agent per 1,000 grams of casein digest. The purpose of the reducing agent is simply to keep the medium in a reduced form and any of the well known sulfhydryl reducing agents may be employed.

Experience has shown that during the production of streptokinase-streptodornase by fermentation, the pH of the medium is gradually lowered due to the elaboration of lactic acid by the growing microorganisms. If the pH is not readjusted during the fermentation to 7.0–7.4, the yield of streptokinase-streptodornase is drastically lowered. Heretofore, pH determinations have been required at 5-minute intervals when intermittent pH adjustment with alkali during the fermentation has been employed. The determination of pH has been required at 10-minute intervals when a continuous flow of aqueous alkali into the fermentation medium has been maintained. Both of these procedures require considerable time and effort in order to maintain the pH of the medium within the operating range of 7.0–7.4.

The present invention is based upon the discovery that the aseptic addition of magnesium carbonate to the inoculated medium at that point in the fermentation when the pH of the medium first drops to 5.5–6.0, followed by the addition of alkali to the medium at that time subsequent to the addition of magnesium carbonate when the pH of the medium drops to 7.0, provides a superior means of controlling the pH of the medium during the fermentation. The alkali which may be employed may be, for example, the hydroxides, carbonates, and bicarbonates of the alkali metals. However, sodium hydroxide and sodium bicarbonate are preferred. It has been found that by the practice of the present invention pH determinations need only be made at one-half hour intervals in order to maintain the pH within the operating range of 7.0–7.4. Thus, pH control is obtained with a minimum of labor throughout the entire fermentation period.

It is indeed surprising that other alkaline earth metal carbonates cannot be employed in lieu of magnesium carbonate in the practice of the present invention. Calcium carbonate buffers the fermentation medium at too low a pH range, and barium carbonate is toxic to the microorganisms.

The novel method of the present invention has numerous advantages. It greatly reduces the total fermentation time within which a given yield of streptokinase-streptodornase may be obtained, and also permits much lower fermentation temperatures, from 23° C. to 31° C. as contrasted with the temperature range of 32° C. to 40° C. currently employed. The most important advantage, however, is the surprising fact that much greater yields of streptokinase-streptodornase per ml. of medium are obtained. This is truly unexpected. One possible explanation may be that the bacteria grow more readily in a medium wherein the lactic acid formed is removed by the novel buffer system of the present invention.

The increased yield of enzymes is of importance not only from an economy point of view but for other reasons as well. Not among the least of these is the ease with which a relatively pure product can be obtained from a fermentation medium of high relative concentration. This is a result of the purification procedures available and necessary for separating the enzymes from the other constituents of the fermentation since these purification procedures are of such a nature that they become increasingly less efficient as the concentration of the enzymes decreases.

In the practice of the present invention, sufficient magnesium carbonate, from 5 to 40 grams per liter, is added to the fermentation medium under aseptic conditions (when the pH of the medium first drops to 5.5–6.0) to raise the pH of the medium to 7.4±0.2. From this point, fermentation is carried out at a temperature of from 23° C. to 31° C., preferably from 26° C. to 30° C., and usually at 28.5° C. During this low temperature fermentation, the pH of the medium will eventually drop to about 7.0. At this point, recourse may be had to one of two alternative alkali treatments; either the single addition of a sufficient amount of a hydroxide, carbonate, or bicarbonate of an alkali metal in solid form to raise the pH to 7.2; or the intermittent addition of a sufficient amount of a hydroxide, carbonate, or bicarbonate of an alkali metal in aqueous solution to maintain the pH at 7.0–7.4. At the termination of the fermentation period, the bacteria are killed by the addition of any convenient bactericide such as, for example, 4-hexyl-1,3-dihydroxybenzene, and the streptokinase-streptodornase is harvested by standard methods.

In addition to an enzyme hydrolyzed casein digest, glycine and a sulfhydryl reducing agent, various other ingredients may often be advantageously added to the fermentation medium. These additional ingredients are referred to as "growth promoting ingredients" and include such things as vitamins, minerals, aminoacids, and trace elements. The following table lists a number of such materials as well as recommended amounts which are advantageous.

TABLE I

| Growth Promoter | Parts By Weight Per Each 1,000 Parts Of Casein Digest |
|---|---|
| $KH_2PO_4$ | 80–160 |
| $KHCO_3$ | 50–100 |
| Uracil | 0.2–0.6 |
| Adenine Sulfate | 0.2–0.6 |
| Nicotinic Acid | .02–.06 |
| Pyridoxine | .03–.07 |
| Tryptophane | 0.4–1.0 |
| Calcium Pantothenate | 0.1–0.3 |
| Thiamin Hydrochloride | .05–.15 |
| Riboflavin | .01–.03 |
| Cystine | 2–6 |

Trace elements are usually added in the form of a salt mixture to furnish very slight amounts of the ions of such metals as iron, magnesium, copper, zinc, etc. It will often be found convenient to prepare a salt mixture from the salts of metals such as the above and to add a small quantity of the mixture to each fermentation. The following table gives the composition of a salt mixture which has been found to be satisfactory when employed in amounts of 40 to 150 ml. per kg. of casein digest.

TABLE II

| Material | Amount |
|---|---|
| $MgSO_4$, kg | 11.5 |
| $CuSO_4·5H_2O$, kg | .05 |
| $ZnSO_4·7H_2O$, kg | .05 |
| $MnCl_4·4H_2O$, kg | .02 |
| $FeSO_4·7H_2O$, kg | .05 |
| HCl, liters | 1.0 |
| Water; q.s. to make, liters | 100 |

A convenient way of preparing the fermentation medium may be illustrated by the following steps: dissolve the desired quantity of enzyme hydrolyzed casein digest in about five times its weight of hot water; sterilize by autoclaving or filtering; add sterile solutions of the required glycine and the sulfhydryl reducing agent; add sterile solutions of the growth promoting materials; and adjust the pH to about 7 to 8. The medium is then ready for inoculation. The above procedure may, of course, be varied, for instance; if the medium is to be sterilized by filtration, all of the ingredients may be added before sterilization; and if the medium is to be sterilized by autoclaving, the glycine may be added before sterilization. It is sometimes advantageous for purity of product to cool the medium to 20° C. or lower before filtering; however, if maximum yield is of prime importance, this is not recommended.

The seed inoculum is prepared by suspending a dried culture of the bacteria in a few liters of a medium such as described above and containing in addition about 20 to 70 parts by weight of a sugar per 1000 parts of basal nitrogen, and growing the bacteria at a temperature of 35°–39° C. for about eight hours until the bacterial count is from about $2 \times 10^9$ to $2 \times 10^{10}$ per ml. A volume of this seed inoculum is then employed to seed the fermentation medium so as to provide an initial bacterial count of about $6 \times 10^7$ to $8 \times 10^8$ per ml.

The bacteria must be furnished with large amounts of a sugar during at least part of their growth in order for them to produce the maximum amounts of streptokinase and streptodornase. Almost any of the common types of sugars may be employed. Among the disaccharides which may be employed are sucrose and maltose and among the monosaccharides which may be employed are glucose and mannose. Various procedures may satisfactorily be utilized in adding the sugar. The usual procedure for adding the sugar comprises allowing the bacteria to grow in the presence of a very small amount, i.e. 20 to 100 parts per 1000 parts of casein digest, for a period of about fourteen hours and then adding the remainder of the sugar gradually over a period of about six to eight hours. Another procedure for adding the sugar comprises adding large amounts of sugar, and preferably all of the sugar, before the fermentation has proceeded for a period of one hour. The total amount of sugar which may be advantageously added varies within relatively wide limits, for instance from 1500 to 4000 parts by weight per 1000 parts of casein digest.

The invention will be more particularly illustrated by the following specific examples which are for purposes of illustration only.

*Example 1*

A fermentation medium was prepared according to the following formulation:

| | |
|---|---|
| Hydrolyzed casein g | 15 |
| Glycine g | 3 |
| Sodium dihydrogen phosphate g | 2.17 |
| Potassium carbonate g | 2 |
| Urea g | 1.7 |
| Uracil mg | 140 |
| Thiamin hydrochloride mg | 30 |
| Calcium pantothenate mg | 5 |
| Pyridoxine mg | 1.7 |
| Nicotinic acid mg | 1 |
| Riboflavin mg | 0.5 |
| Sucrose g | 32.5 |

Tap water, q.s. to make 1000 ml.

The pH of the medium was adjusted to 6.7 with 5 N hydrochloric acid and the medium was then sterilized in an autoclave for 30 minutes at 120° C. The pH of the medium after sterilization and cooling to 25° C. was 7.5. A 3-liter volume of the sterilized medium was placed in each of seven laboratory fermenters and each aliquot of medium was inoculated with sufficient *Strepto*-

*coccus hemolyticus* seed inoculum to provide a bacterial count of from about $6 \times 10^7$ to about $8 \times 10^8$ per ml. The seven inoculated aliquots of medium were then subjected to the following operations:

Medium 1: Stirred and incubated at 35° C. for 12.0 hours; with 5 N sodium hydroxide used intermittently to maintain the pH at 7.0.

Medium 2: Stirred and incubated at 28° C. for 11.5 hours; with 5 N sodium hydroxide used intermittently to maintain the pH at 7.0.

Medium 3: Stirred and incubated at 28.5° C. for 8.5 hours; with 20 g./l. of magnesium carbonate added when the pH first dropped to 5.5–6.0, and no further pH adjustment made during the fermentation.

Medium 4: Stirred and incubated at 28.5° C. for 8.0 hours; with 20 g./l. of magnesium carbonate added when the pH first dropped to 5.5–6.0, and 5 g./l. of sodium bicarbonate added when the pH next dropped to 7.0.

Medium 5: Stirred and incubated at 28.5° C. for 9.0 hours; with 20 g./l. of magnesium carbonate added when the pH first dropped to 5.5–6.0, and 5 N sodium hydroxide used intermittently when the pH next dropped to 7.0 to maintain the pH at 7.0.

Medium 6: Stirred and incubated at 28.5° C. for 7.0 hours; with 15 g./l. of magnesium carbonate added when the pH first dropped to 5.5–6.0, and 5 N sodium hydroxide used intermittently when the pH next dropped to 7.0 to maintain the pH at 7.0.

Medium 7: Stirred and incubated at 28.5° C. for 9.0 hours; with 10 g./l. of magnesium carbonate added when the pH first dropped to 5.5–6.0, and 5 N sodium hydroxide used intermittently when the pH next dropped to 7.0 to maintain the pH at 7.0.

The number of units of streptokinase contained in one ml. portions of the seven aliquots of medium was determined at intervals of from one-half to 2 hours and the assay results are set forth in Table III below:

TABLE III

| Fermentation time (hours) | Streptokinase (units/ml.) in Medium | | | | | | |
|---|---|---|---|---|---|---|---|
| | 1 | 2 | 3 | 4 | 5 | 6 | 7 |
| 2.5 | 800 | | | | | | |
| 3.0 | 940 | | | | | | |
| 3.5 | | 320 | | 940 | 625 | 1,330 | 1,120 |
| 4.0 | 1,170 | | | 1,630 | 1,020 | 2,040 | 1,720 |
| 4.5 | | 700 | | | | | |
| 5.0 | 1,240 | | | 2,030 | 1,440 | 2,470 | 2,190 |
| 5.5 | | 1,120 | 2,070 | | | | |
| 6.0 | 1,570 | | | 2,940 | 1,940 | 3,090 | 2,820 |
| 6.5 | | 1,590 | 2,070 | | | | |
| 7.0 | 1,600 | | | | 2,240 | 3,530 | 3,330 |
| 7.5 | | 2,120 | 2,140 | | | | |
| 8.0 | | | | 3,230 | 2,320 | | |
| 8.5 | | 2,120 | 2,390 | | | | |
| 9.0 | 1,600 | | | | | | |
| 9.5 | | | | | 2,920 | | 3,500 |
| 10.0 | 1,740 | | | | | | |
| 10.5 | | | | | | | |
| 11.0 | | | | | | | |
| 11.5 | | | 3,480 | | | | |
| 12.0 | 1,900 | | | | | | |

The above data illustrate the fact that consistently higher yields of enzyme per unit of time are obtained by the practice of the novel method of the present invention as compared with the prior art process.

*Example 2*

A 5.0-kilogram quantity of hydrolyzed casein was dissolved in about 40 liters of tap water. This dissolved hydrolyzed casein was diluted to approximately 250 liters. The following ingredients, in the amounts and sequence shown, were then added: 1.050 kg. of glycine, 0.759 kg. of sodium dihydrogen phosphate, 0.7 kg. of potassium carbonate, 0.595 kg. of urea, 49 g. of uracil, 10.5 g. of thiamin hydrochloride, 1.75 g. of calcium pantothenate, 0.595 g. of pyridoxine, 0.35 g. of nicotinic acid, 0.175 g. of riboflavin, and 11.37 kg. of granulated sucrose. The total volume was brought up to 320 liters with tap water and adjusted to pH 6.6 with hydrochloric acid, then sterilized for 15 minutes at 120° C. A 30-liter portion of the medium; drawn off for seed bottle use; was inoculated with *Streptococcus hemolyticus* seed inoculum and incubated at 37° C. until the pH dropped to pH 6.0. Prior to the addition of inoculum, the bulk fermentation medium (having a pH of 7.5) was brought up to 35° C. The contents of the seed bottle were then added to the bulk fermentation medium. The inoculated bulk fermentation medium was incubated at 35° C. until the pH dropped to 6.0. At this point, 3.5 kg. of $MgCO_3$ was added under aseptic conditions, raising the pH to 7.35, and the temperature of the fermentation broth was lowered to 28.5° C. The temperature was held at 28.5° C. for the remainder of the run. About 1¼ hours later, when the pH had dropped to 7.0, treatment with 5 N sodium hydroxide solution was instituted. Additions of 5 N sodium hydroxide solution to the fermentation broth were made intermittently, as needed, to maintain the pH in the range 7.0–7.2. The elapsed time of the fermentation, subsequent to the addition of magnesium carbonate, was 10 hours. The 315 liters of fermentation harvest broth were inactivated by the addition of 31.5 grams of 4-hexyl-1,3-dihydroxybenzene. The harvest broth assayed 4200 units of streptokinase and 5000 units of streptodornase per milliliter. This compares to an average of about 1100 units of streptokinase and 1100 units of streptodornase per milliliter obtained by the process of the prior art.

What is claimed is:

1. In a fermentation process for producing mixtures containing streptokinase and streptodornase which comprises inoculating an aqueous nutrient medium with a strain of beta hemolytic streptococci and allowing the bacteria to grow at a temperature between 23° C. and 31° C., the improvement which comprises adding to said medium from 5 to 40 grams per liter of magnesium carbonate when the pH of said medium first drops to 5.5–6.0, and continuing the fermentation while maintaining the pH of said medium within the range of 7.0–7.4 by the addition of an alkali selected from the group consisting of the hydroxides, carbonates, and bicarbonates of the alkali metals.

2. The improvement of claim 1 wherein said alkali is sodium hydroxide.

3. The improvement of claim 1 wherein said alkali is sodium bicarbonate.

4. The improvement of claim 1 wherein said alkali is sodium carbonate.

5. The improvement of claim 1 wherein said alkali is potassium hydroxide.

6. The improvement of claim 1 wherein said alkali is potassium bicarbonate.

7. The improvement of claim 1 wherein said alkali is potassium carbonate.

No references cited.